Aug. 18, 1936.  B. F. GRAVELY  2,051,443
ROTARY PLOW
Filed March 9, 1935  3 Sheets-Sheet 1
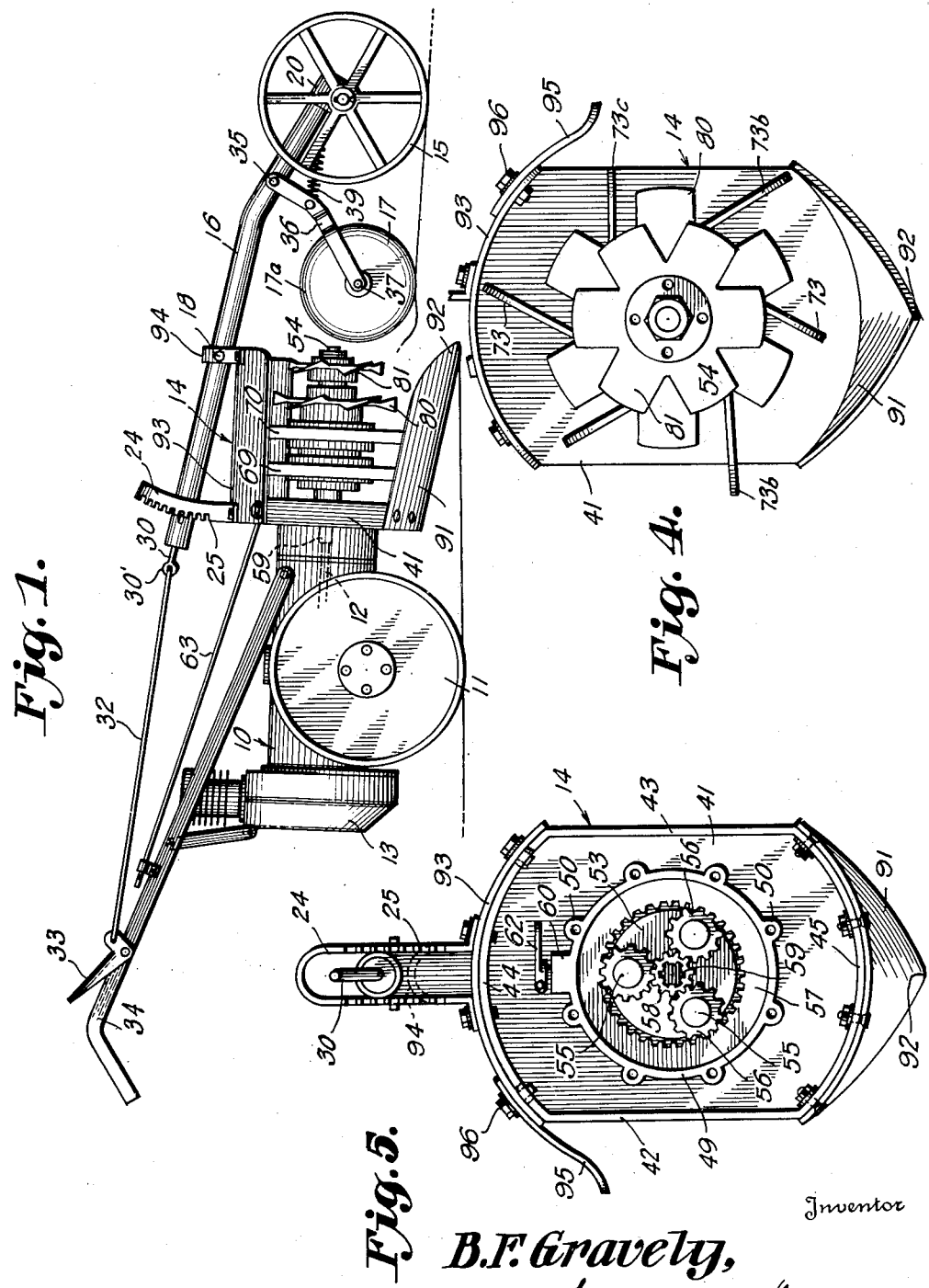
Inventor
B. F. Gravely,
Attorney Aug. 18, 1936. B. F. GRAVELY 2,051,443
ROTARY PLOW
Filed March 9, 1935 3 Sheets-Sheet 2
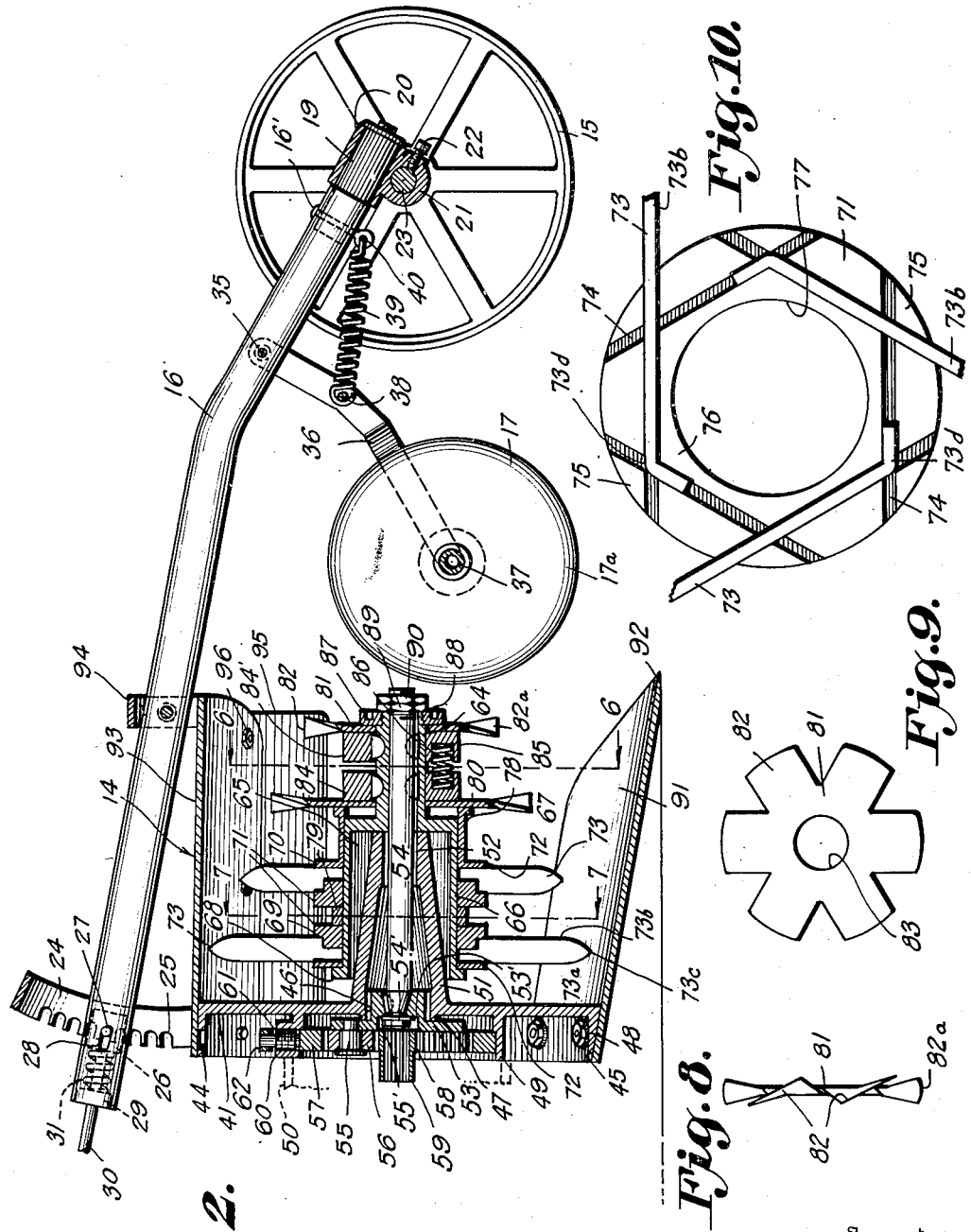
Inventor
B.F. Gravely,
By [signature]
Attorney Aug. 18, 1936.  B. F. GRAVELY  2,051,443
ROTARY PLOW
Filed March 9, 1935  3 Sheets-Sheet 3
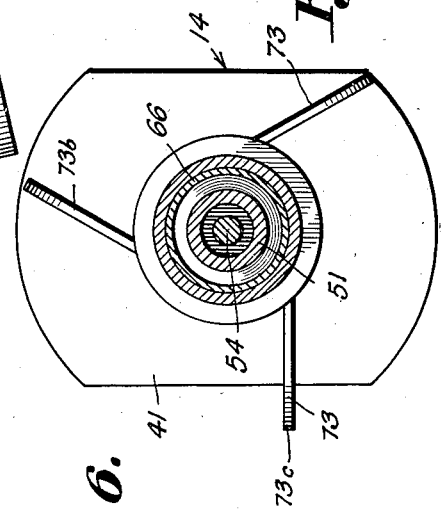
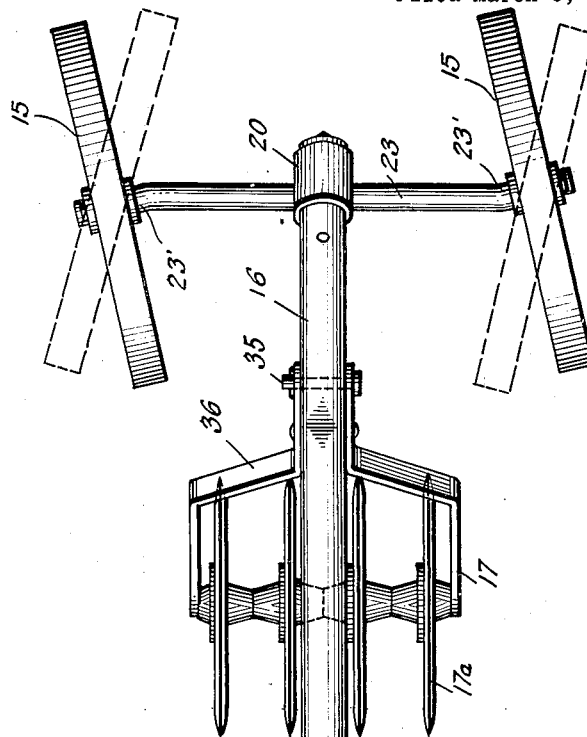
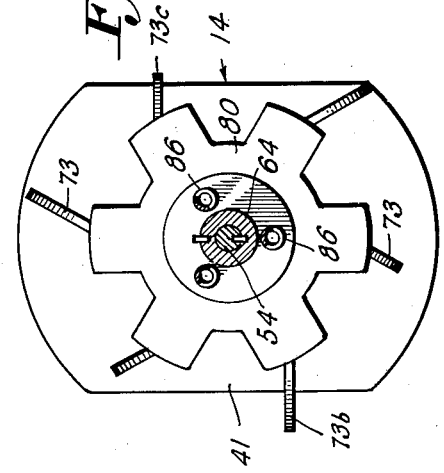
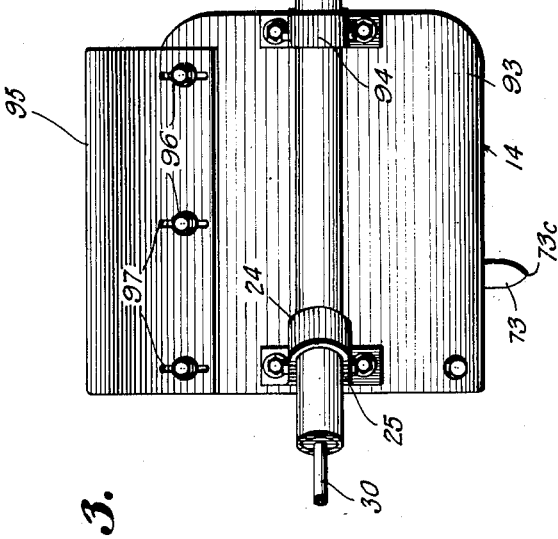
Inventor
B. F. Gravely,
By  Isaac Chandler
Attorney Patented Aug. 18, 1936

2,051,443

UNITED STATES PATENT OFFICE 2,051,443

ROTARY PLOW

Benjamin Franklin Gravely, Dunbar, W. Va.

Application March 9, 1935, Serial No. 10,267

10 Claims. (Cl. 97—38)

This invention relates to devices for tilling the soil and more particularly to a plow which will be so constructed as to comminute the surface of the ground to a proper depth and leave it free from furrows, so that it will be substantially smooth and in proper condition for seeding or sodding.

Another object is to provide means for deflecting and cutting vegetation on the soil to be treated, means for raising the surface soil, means for cutting the same and passing it rearwardly, and means for further breaking up the soil thus cut and simultaneously throwing the same away from the device.

A further object is to mount certain moving parts of the machine as to prevent damage thereto upon contacting with an obstruction.

Other objects and advantages will be apparent from the following description when considered in connection with the accompanying drawings in which Figure 1 is a side elevation of the device.

Figure 2 is a vertical longitudinal section.

Figure 3 is a plan view of the invention.

Figure 4 is a front view showing the arrangement of the plow proper and parts thereabove.

Figure 5 is a rear view thereof.

Figure 6 is a section on the line 6—6 of Figure 2.

Figure 7 is a section on the line 7—7 of Figure 2.

Figure 8 is an edge view of a certain cutter used herein.

Figure 9 is a face view thereof.

Figure 10 is a detail showing the manner of mounting certain tines used herein.

In the drawings, 10 represents a tractor mechanism which forms no portion of the present invention but which will be briefly described with the statement that it is provided with a ground wheel 11 driven from a shaft 12, operated by an engine 13. The shaft 12 extends to the forward end of the tractor where it is splined to the shaft of the plow mechanism now to be described, which mechanism is connected to the forward end of the tractor and propelled thereby.

The plow mechanism, which constitutes the present invention, includes the plow section designated as a whole by the numeral 14, the depth gauge wheels 15, the supporting bar 16, and deflecting unit 17. The bar 16, which is tubular, is mounted for vertical movement on a pivot 18 at the forward end of a portion of the plow section 14, which portion will be described later herein. Secured in the forward end of the bar, by a pin 16', is a trunnion 19, mounted upon which is a member 20 having a transverse tubular portion 21 formed integral therewith. Passing through this tubular portion and held at its center by a set screw 22 passing through said tubular portion, is an axle 23, upon the outer ends of which the depth gauge wheels 15 are journaled. The extremities of the axle 23 are offset, in opposite directions, as at 23', so as to cause the wheels to tend to draw the machine to one side, to counteract the side pull caused by the action of the rotary members of the plow section. It will be noted that the effect of this offsetting of the axle ends may be adjusted by rotating the axle in the tubular portion 21 after loosening the set screw.

The rear end of the supporting bar 16 passes through an arcuate yoke 24 mounted upon the rear of the upper side of the plow section 14 and the legs of this yoke are provided with notches 25. Slidably mounted in the rear end of the tubular supporting bar 16 is a piston 26 in which is secured a transverse pin 27, the ends of which project beyond the piston and through the slots 28 in opposite sides of the supporting bar to rest, selectively, in the notches 25. Secured to the piston 26 and passing through a plug 29 fastened in the extreme rear end of the bar 16, is a rod 30 having an eye 30' in its free end and encircling this rod, with its ends engaging the piston 26 and plugs 29, respectively, is a coil spring 31 which holds the ends of the pin 27 firmly within the notches 25. A second bar 32 is connected to the eye 30' and to a grip 33 pivoted to one of the handles 34 of the tractor.

Connected to the supporting bar 16 immediately in the rear of the depth gauge wheels 15, is the deflecting unit 17, comprising a fork 36 pivoted to said supporting bar by means of a pin 35 passing therethrough and having an axle 37 supported in its lower ends. Mounted for rotation on this axle are the equally spaced cutter disks 17a. Connecting the legs of the fork 36, just below their point of attachment to the supporting bar, is a pin 38 secured to which is one end of a coil spring 39 whose other end is connected to an eye 40 on the lower end of the pin 16'. This spring serves to hold the disks 17a against upward movement. It will be noted that the peripheries of these disks are sharp and knife-like.

Immediately in the rear of the cutter disks 17a is the plow section 14 which will now be described. This section includes a vertically arranged supporting plate 41 having straight parallel sides 42 and 43, curved upper and lower sides 44 and 45 and a central opening 46 surrounded by a rearwardly projecting flange 47. Projecting rearwardly from the edge of the plate 41, and completely surrounding same, is a flange 48 within which is a centrally arranged circular flange 49 concentric with the flange 47 and of the same height as the flange 48. The flange 49 has, on its outer face, a number of equally spaced perforated lugs 50, through the medium of which the plow section is securely bolted to corresponding lugs 50' on the forward end of the tractor. Extending forwardly from the center of the plate 41, with its base surrounding the opening 46, is a tubular supporting member 51 having an opening 52 in its outer end. Supported in the opening 46, on a suitable anti-friction bearing is the hub of a carrier disk 53, within which hub is keyed the rear end of a shaft 54, the other end of the shaft extending through and beyond the forward end of the supporting member 51. An intermediate portion of this shaft is journaled in the opening 52, at the outer end of the supporting member. Secured to the rear face of the carrier disk 53 are stub shafts 55 on which are mounted the planet gears 56 of a planetary transmission which planet gears are in mesh with the teeth of an orbit gear 57 supported in the flange 49, and also in mesh with a sun gear 58, formed upon the inner end of a tube 59 splined upon the forward end of the tractor shaft 12. It will be noted that the carrier disk 53 bears against the flange 47, which prevents forward movement of the shaft 54. It will be noted that the rear face of the carrier disk 53 is recessed as at 53' and that the end of the shaft 54 projects into this recess where it is fitted with a nut 54'. Beneath this nut and encircling the threaded end of the shaft is a washer 55' which bears against the lower wall of the recess 53'. By means of this nut and washer arrangement, the end of the shaft is held within the hub of the carrier disk 53.

Threaded through a boss 60, on the upper side of the flange 49, is a screw 61 to which is secured a transverse lever 62 connected to a rod 63 which extends to a point adjacent the grip 33 on the tractor handle. Through the medium of this rod, the screw 61 may be turned so as to cause it to engage the orbit gear 57 and hold the same against rotation, or so as to release the same.

Keyed to the forward end of the shaft 54, outwardly of the supporting member 51, is the hub portion 64 of an arbor which arbor also includes a rearwardly extending cup-like web portion 66 surrounding and spaced from the supporting member 51 and connected to a radial flange 67 at the rear end of the hub. At the free end of the web portion 66 is a radial flange 68, forming a stop. Mounted upon the web portion 66 of the arbor 65, and frictionally held for rotation therewith are the tine assemblies 69 and 70 which, in all essential details, are identically constructed and one of which is illustrated, in front elevation, in Figure 10. Each tine assembly includes a pair of clamping disks 71 and 72, between which is held a group of tines 73, preferably three in number. The clamping disk 71 has, on one of its side faces, a plurality of intersecting grooves 74 defined by marginal bosses 75 and a central hexagonal boss 76. Perforating the center of the hexagonal boss is a circular opening 77 to receive the web of the arbor 65. This structure is clearly illustrated in Figure 10 with the exception of the clamping disk 72.

The clamping disk 72 of the tine assembly 69 is in the form of a flat washer with a diameter and central opening corresponding to those of the disk 71, and having smooth side faces. The clamping disk 72 of the tine assembly 70 is similarly constructed excepting that a lateral flange surrounds its central opening, to form a sleeve 78.

The tines 73 are elongated blades having flat, relatively broad ground engaging faces 73a and narrower edge faces 73b, the latter being brought together at one end to form ground penetrating points 73c. The opposite end of each tine is bent at an obtuse angle, across its broader face, to provide securing means, as shown at 73d. In assembling the parts comprising the tine assemblies 69 and 70, three of the tines are placed upon a clamping disk 71, each being so positioned as to lie in two of the intersecting grooves 74, with its bend 73d at the point of intersection of said grooves and with its pointed end projecting beyond the periphery of the disk, as shown in Figure 10. A clamping disk 72 is then placed upon the disk 71, so that the tines will be held therebetween. The parts thus assembled are then slid upon the web 66 of the arbor 65.

It will be noted, by reference to Figure 2 of the drawings, that the tine assemblies 70 and 71 are mounted upon the web 66 with the web passing through the central openings of the clamping disks, with the washer-like clamping disk 72 of the assembly 69 engaging the flange 68, of the web, and with the sleeve 78 of the other clamping disk 72 projecting forwardly beyond the web portion of the arbor, so as to overlie the hub portion thereof. It will also be noted that the tine assemblies are spaced apart by a collar 79.

In advance of the tine assemblies, just described, and mounted upon the hub portion 64 of the arbor 65, for rotation therewith, is a pair of cutting wheels 80 and 81, identically constructed, except as to diameter, one of which is illustrated in Figures 8 and 9. Each of these cutting wheels comprises a flat disk notched inwardly from its margin to form radial blades 82, and having a central opening 83 of a size to fit upon the hub 64 of the arbor. Each of these blades is slightly twisted, in the same direction, to produce a structure similar to that of a rotary fan, and the extremities of these blades are reduced to a cutting edge as shown at 82a. One of the cutting wheels is slightly larger in diameter than the other and, by referring to Figure 2, it will be seen that the larger is so mounted upon the hub 64 as to bear against the projecting end of the sleeve 78, and that the smaller one is spaced therefrom and is positioned adjacent the forward end of the hub.

Between the cutting wheels 80 and 81, and bearing thereagainst, are two friction collars, 84 and 84'. These are so keyed upon the hub 64 as to rotate therewith, but to move longitudinally thereof, and in their mutually adjacent faces are a number of pockets 85, equally spaced. Positioned in these pockets are the ends of coil springs 86 interposed between the friction collars, which springs tend to force said collars apart, likewise the cutting wheels, that numbered 80 being forced against the projecting end of the sleeve 78, and that numbered 81 being forced against a nut 87 threaded upon the outer end of the arbor hub 64, which end is reduced in diameter to provide a shoulder 88 against which said nut impinges. On the outer end of the shaft 54, beyond the arbor hub 64, and bearing thereagainst, is a holding nut 89 with a jam nut 90. By means of this holding nut, the shaft 54 may be drawn forwardly through the supporting member 51, so as to adjust the carrier disk 53 in proper engagement with the flange 47 and so as to adjust the inner end of the arbor 64 in proper engagement against the forward end of said supporting member.

From the foregoing description, it will be noted that the tine assemblies 69 and 70 and the cutting wheels 80 are not rigidly secured to the web and hub portions, respectively, of the arbor 65, but rotate therewith through frictional engagement of the parts, which frictional engagement is brought about by the pressure of the springs 86 against the collars 83 and 84. This structure is provided to prevent damage should the rotating parts encounter an obstruction. In that event, said parts will slip upon their mountings until the obstruction has been passed.

Bolted at its rear edge to the flange 48, at the lower side of the supporting plate 41, is a plowshare 91, which extends forwardly and downwardly beyond the forward end of the shaft 54 to a point below the cutting disks 17a and approximately in vertical alinement with the rear edges thereof. This plow share is shaped to provide a longitudinal gutter, at its center, and its forward end is pointed as at 92.

Bolted to the flange 48, at the upper side of the plate 41, and extending forwardly over the rotary members of the plow section, is a cover plate 93, upon the upper side of which, at its forward end, is secured a yoke 94 which supports the pin 18 to which the bar 16 is pivoted.

Secured to one side of the cover plate 93, and projecting outwardly and downwardly therefrom, for approximately its entire length, is a fender 95. This fender is secured to the cover plate by bolts 96 treaded into the latter, which bolts pass through slots 97 in the fender to permit of adjustment thereof, as will be readily understood.

The operation of the device is as follows:

Assuming that the motor 13 is in operation, causing rotation of its shaft 12, the tube 59 will also be caused to rotate, carrying with it the sun gear 58, which will cause the planet gears 56 and orbit gear 57 to rotate idly. The rod 63 is then manipulated to rotate the screw 61 into engagement with the orbit gear holding the same against rotation. This will then cause rotation of the carrier disk 53 and the shaft 54, to which said disk is connected, also the arbor 65, the hub 64 of which is keyed to said shaft. The friction collars 83 and 84, being connected to the hub, will rotate therewith and will also cause rotation of the cutting wheels 80 and 81 and the tine assemblies 69 and 70, because of the frictional engagement of the parts, as already described.

After the rotating parts of the plow section have been set in motion, the tractor is caused to advance over the ground, pushing the present mechanism ahead of it. Vegetation, such as weeds, corn, and so forth, in the path of the mechanism, will be encountered and knocked down by the deflecting unit 17. The progress of the machine will cause penetration of the plow 91 which will lift the surface soil, together with any vegetation thereon, against the disks 17a, causing such soil and vegetation to be cut by said disks. As the machine continues to advance, the material thus cut is encountered by the rotating cutting wheels 80 and 81, which cut it transversely and at the same time throw it rearwardly into the paths of the rotating tines. Here it is further broken up and thrown to one side. In this way, the entire surface of the plot of land may be loosened, broken up, and evenly distributed, so as to be in proper condition for planting without further preparation.

The depth of the cut of the plow 91 may be gauged by adjusting the bar 16 at the yoke 24, in the manner previously described herein.

The fender 95 may be adjusted with respect to the cover plate 93, so as to cause the coil to be thrown in such a manner as to produce ditches of desired widths, divided by ridges.

What is claimed is:

1. A soil tilling machine adapted to travel over the surface of the ground, having means for raising the soil, means for simultaneously cutting the raised soil and throwing the same rearwardly of the machine, and means for breaking the cut soil and throwing the same transversely of and away from the machine.

2. A soil tilling machine adapted to travel over the surface of the ground, having means for raising the soil, means for simultaneously cutting the raised soil at right angles to the direction of travel and throwing the same rearwardly of the machine, means for breaking the cut soil and throwing the same transversely of and away from the machine, and adjustable means for controlling the thrown soil.

3. A soil tilling machine adapted to travel over the surface of the ground and having means for cutting soil transversely of the path of the machine and throwing the cut soil rearwardly, means for breaking the cut soil and throwing the soil away from the machine, and means for controlling the thrown soil.

4. A soil tilling machine adapted to travel over the surface of the ground and having a plurality of revolvable soil cutting elements spaced longitudinally of the machine and increasing in diameter from front to rear, said elements being arranged to throw cut soil rearwardly, and means for breaking the cut soil and throwing it away from the machine.

5. A soil tilling machine adapted to travel over the surface of the ground and having a plurality of revolvable soil cutting elements spaced longitudinally of the machine and increasing in diameter from front to rear, said elements being arranged to throw cut soil rearwardly, and a series of soil breakers each including a set of tines and arranged to revolve on an axis longitudinally of the machine for breaking the cut soil and throwing it away from the machine.

6. A soil tilling machine adapted to travel over the surface of the ground and having a plurality of revolvable soil cutting elements spaced longitudinally of the machine and increasing in diameter from front to rear, said elements being arranged to throw cut soil rearwardly, means for breaking the cut soil and throwing it away from the machine, and means for controlling the thrown soil.

7. A soil tilling machine adapted to travel over the surface of the ground and having means for cutting soil transversely of the path of the machine and throwing the cut soil rearwardly, a series of soil breakers each including a set of tines and arranged to revolve on an axis longitudinally of the machine for breaking the cut soil and throwing it away from the machine, and means for controlling the thrown soil.

8. A soil tilling machine adapted to travel over the surface of the ground and having a plurality of revolvable soil cutting elements spaced longitudinally of the machine and increasing in diameter from front to rear, said elements being arranged to throw cut soil rearwardly, a series of soil breakers each including a set of tines and arranged to revolve on an axis longitudinally of the machine for breaking the cut soil and throwing it away from the machine, and means for controlling the thrown soil.

9. In a machine for tilling soil, a longitudinally extending driven shaft, a cylindrical arbor keyed on said shaft and having one cylindrical end of greater diameter than the other cylindrical end to provide a shoulder between the ends, a stop collar at the extremity of the larger end, soil tilling members having hubs rotatably mounted on said larger end, one of said hubs being in contact with the stop collar and another of said hubs projecting beyond the shoulder and overhanging the smaller end, other soil tilling members mounted rotatably on the said smaller end with one of the last members bearing against said overhanging hub, and friction clutch means keyed to said arbor and effecting yieldable driving of said soil tilling members.

10. In a machine for tilling soil, a revolvably driven arbor having a friction collar at each end, a series of soil tilling members revolvably mounted on said arbor with the end members of the series bearing against said collars, a pair of juxtapositioned friction rings splined on the arbor between two of said members, and spring means between said rings to force said rings apart and against the adjacent members to cause frictional engagement between certain of said members and to force the end members against said collars.

BENJAMIN F. GRAVELY.